UNITED STATES PATENT OFFICE.

EDGAR ARTHUR ASHCROFT, OF LONDON, ENGLAND.

MANUFACTURE OF POTASSIUM CHLORID FROM NATURAL SILICATES, ROCKS, MINERALS, RESIDUES, OR WASTES CONTAINING POTASSIUM.

1,350,091.   Specification of Letters Patent.   Patented Aug. 17, 1920.

No Drawing.   Application filed November 13, 1917. Serial No. 201,812.

*To all whom it may concern:*

Be it known that I, EDGAR ARTHUR ASHCROFT, a subject of the King of Great Britain, residing at 65 London Wall, in the city of London, and 4 Whitehall Court, Whitehall, in the county of London, England, have invented new and useful Improvements in the Manufacture of Potassium Chlorid from Natural Silicates, Rocks, Minerals, Residues, or Wastes containing Potassium, of which the following is a specification.

My invention is based on the following reaction which I believe I am the first to investigate. This reaction is a reversible one and goes to an equilibrium according to the number of molecules of the several reacting bodies in immediate juxtaposition. It is affected also by other physical conditions, particularly the temperature of reaction and of solidification of the salts contained in the reacting mass, and by the time and by the size of the particles of feldspathic material. The general reaction may be expressed:—

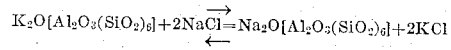

$$K_2O[Al_2O_3(SiO_2)_6] + 2NaCl \rightleftarrows Na_2O[Al_2O_3(SiO_2)_6] + 2KCl$$

But for the sodium salts and resulting soda feldspar other materials may be substituted wholly or in part for instance calcium or magnesium.

That this reaction takes place as stated I have now exhaustively proved by many experiments and I have determined the conditions of equilibrium of the reaction which may be broadly stated to be according to the following table under conditions governed by the fusion point of the salts used in said experiments and other conditions thereof. It is essential for success in carrying out this reaction that air or moisture and furnace gases containing either air or moisture be excluded.

Under such conditions (but not otherwise) a perfectly clean and quantitative reaction occurs and goes to equilibrium as shown by the following examples:

Example No. 1.

Details of five experiments to determine equilibrium conditions of reaction between sodium chlorid and feldspar with exclusion of air.

Constants 1 hour heating at 900° to 950° C. 60 mesh grinding. Original content of feldspar 10.5% $K_2O$ and 2.7% $Na_2O$.

| No. of test. | Per cent. feldspar in mixture taken. | Per cent. sodium chlorid in mixture taken. | Per cent. KCl in product, all $H_2O$ soluble and quite neutral. | Per cent. NaCl in product. | Weight of product (salts only). | Per cent. extraction of $K_2O$ from feldspar. |
|---|---|---|---|---|---|---|
| | | | | | Approximate per cent. of weight used. | Per cent. |
| A | 90 | 10 | 33.4 | 69.6 | 103 | 22.8 |
| C | 70 | 30 | 21.66 | 78.34 | 101 | 57.1 |
| E | 50 | 50 | 9.88 | 90.12 | 100 | 60.0 |
| G | 30 | 70 | 4.68 | 93.32 | 99.5 | 65.75 |
| J | 10 | 90 | 1.39 | 98.61 | 99.0 | 79.85 |

All mixtures were heated in closed crucibles with careful exclusion of air moisture or furnace gases both during heating and cooling and were afterward leached with water and resulting salts and residues analyzed and weighed.

It was further found that finer grinding will slightly increase the extraction and lessen the requisite time of heating. Also that the reaction may be carried further by heating for 2 hours to 1000° C. if air is carefully excluded. So it appears that an equilibrium is reached at somewhere near the above points under conditions of the named constants and this equilibrium varies with other constants in the usual manner for mass reactions.

At any temperature under 1,200° C. no fusion or alteration of feldspar takes place beyond the substitution of $Na_2O$ for $K_2O$. The dried residue (albite or other feldspar) is very similar in appearance and all characteristics to the original feldspar. The weight of residue corresponds closely to original weight altered to the equivalent of the substituted base. The weight of mixed salts recovered also closely corresponds to that required by the reaction.

Similar reactions reaching a different equilibrium in each case take place when other anhydrous chlorids are substituted for the sodium chlorid but in general such salts should be capable of withstanding the temperature necessary for reaction without decomposition or volatilization and water of hydration should be absent.

If air or moisture should be admitted during the heating of the salt and the feldspar together other reactions take place, a very large loss of chlorin from the salt and potassium salt occurs the basic mixture resulting tends to fuse and the extraction is much poorer. In fact the process becomes technically impossible under those conditions. This effect is shown in Example No. 3 hereinafter described.

From a study of the conditions of equilibrium in the case of sodium chlorid and feldspar as set out in Example No. 1 it is evident that complete extraction of the potash cannot take place without considerable dilution of the product of potassium chlorid with sodium chlorid, and this necessitates the handling in the process of large quantities of sodium chlorid and further that these deleterious conditions are aggravated by the fact that a certain measure of reversion may take place during cooling from the maximum temperature employed to the temperature of solidification of the reacting salt.

It is possible to remedy this defect and obtain practically complete extraction of the potash by retreatment of the leached residue when this is economical.

The best conditions as shown by the experiment for a single heat maximum extraction are to heat the material with the selected quantity of salt say 1 to 1 for 2 hours at 1000° to 1050° C. with careful exclusion of air. Under these conditions I have obtained in one heat an effective extraction of 86% of the potash content of the material and recovery of 96% of the surplus salt employed.

A like result with other incidental advantages may be obtained by adopting the percolation method as described in Example No. 2.

Almost any material containing insoluble potassium compounds may be employed as the raw material for this process. For instance I may employ the materials in the following list against each of which is placed the usual average content of available potash expressed as potassium oxid ($K_2O$):

|  | Percentage of $K_2O$ |
|---|---|
| 1. Clean leucite (picked) | 15 to 20% |
| 2. Clean potash feldspar (orthoclase) picked veins | 12 to 16% |
| 3. Clean pegmatite rock (native dikes or picked) | 8 to 13% |
| 4. Clean potash granite (native) | 6 to 8% |
| 5. China clay sands or residues | 4 to 7% |
| 6. Concentrated from greensand (or other sources containing similar ingredients) | Various% |

All these materials which occur in great abundance in nature may be subjected to the herein described treatment whereby from 70 to 90% of their entire potash content may be very cheaply and directly recovered in the form of clean neutral potassium chlorid without the use or admixture of any other materials than the selected substituting salt for instance sodium chlorid, magnesium chloride or the like. The excess of reacting salt over that required for the reaction is usefully recovered for use again.

In carrying out my improved process I may mix and heat the materials together in any kind of container or furnace which will secure the requisite exclusion of moisture or air.

The simple procedure of heating the mixed salt and feldspar in a closed container requires very little description. The containers may be of any suitable size, form and material, provided always that they serve the purpose of retaining the material and excluding the air and furnace gases as specified. The furnace for heating them may also be of any desired and suitable construction.

Or I may operate in another way namely by causing the reacting salt to percolate downward in a fused condition through a bed of the material containing the potassium and provide drainage or escape channels whereby the resulting fused salts may flow away in fused condition and may be so collected. The first runnings of salt so collected are the richest in potassium chlorid and may go as high as 50% KCl and may average say 25% KCl in continuous work the remainder being nearly pure NaCl so that separation and recovery of both salts can be carried out very readily by crystallization from water solution in known or suitable ways or the mixture of salts so obtained may be employed directly in processes requiring such mixtures. A small addition of magnesium chlorid adds to the fluidity and assists percolation when working the process in this manner but such addition is not essential to success. The percolation may also be assisted if desired by creating a slight suction or partial vacuum in the drainage system below the charge.

I may employ for carrying this percolation method into effect a vertical retort provided with means at the lower end for collecting the percolating salts and cooling them out of contact with air or moisture. The salt percolates downward through the ground material as it fuses so that the formed KCl is removed rapidly from proximity to the reacting potassium containing body and this removal takes place at the highest temperature of operation when the salt is fully fused, thereby preventing any tendency to reversion. It is possible by this method of working to both collect a mixed salt rich in potassium (first runnings) from which the regular output of potassium products from the works may be directly and economically obtained and also to more completely react the remaining potassium in the residues with fresh salt removing thereby the maximum possible percentage of potassium from the raw material employed. The salt finally washed from the residue may be utilized again in the process and its small remaining potassium content (if any) will then be recovered usefully after reinforcement by the KCl from the reaction.

In this process no loss occurs except trifling losses due to the handling of materials and the percentage of recovery is high while the entire consumption of materials and cost of operation are extremely low.

*Example No. 2.*

To make the herein described percolation method of working more clear I describe the following experiment carried out with a sample of feldspathic rock resembling pegmatite in content and consisting mainly of potash feldspar. The assay was $K_2O$ 10.5% $Na_2O$ 2.5%. The material was crushed in an ordinary iron mill to all pass a 60 mesh sieve but the grinding was by no means uniform.

The apparatus consisted of a steel crucible placed inside a plumbago crucible which acted as a muffle. Below the steel crucible and fitting tightly on to it was a nickel crucible serving as a receptacle for the percolating salts. The bottom of the steel crucible was perforated and over the perforations was placed a smaller inverted nickel crucible acting as a shield and retaining the feldspar while allowing the fused salt to flow out. This answered the desired end in a very satisfactory manner.

250 grams of the powdered material were mixed intimately with 50 grams of salt and the mixture charged into the steel crucible supported in the plumbago crucible which formed a muffle. 200 grams additional salt were added on top of the charge of feldspar slowly during the heat (which lasted 2 hours). The heat was a gas blast jet and was applied outside the plumbago crucible. The temperature was not allowed to exceed 1,000° C. in the center of the charge and was measured by a pyrometer. As soon as the salt fused it soaked and percolated downward past the small nickel shield through the perforations in the bottom of the steel crucible and into the nickel receiver. As long as fresh salt was added from above the excess of salt (at first richly charged with KCl) drained from below and accumulated in the receiver. As a result of the experiment 97 grams of fused mixed salt assaying 25% KCl and 75% NaCl was obtained practically free from any impurity while approximately 160 grams mixed salt which contained 6% KCl and 94% NaCl and was free from any impurity was extracted from the residues by water solution as pure neutral chlorid solution.

The residues which were carefully recovered washed and dried retained all the characteristics of crushed feldspar (now mainly soda feldspar) even to the crystalline form of the particles as examined under the microscope but the potash content now assayed 2% $K_2O$ while the soda content had increased to 10.8% $Na_2O$. The total weight (original taken 250 grams) was now 245.7 grams. All these figures correspond with remarkable closeness to the requirements of the reaction herein described and are clear evidence that this reaction actually takes place quantitatively so long as air and moisture are excluded.

Both the iron crucible and the nickel crucible were quite unchanged by contact with the hot charge in the absence of air or moisture for instance no change in weight even of the order of a few milligrams could be detected in the completely buried nickel shield. Parts exposed to the air are however rapidly attacked.

Furthermore it was shown by experiment that by passing additional salt through the feldspar a further extraction of potassium from the residues results until practically all the $K_2O$ is displaced by $Na_2O$.

Moreover the reversible nature of the reaction was clearly shown by mixing the extracted residue from the above percolation with an equal weight of pure KCl and heating to 1,000° C. when a frit was obtained yielding on extraction with water a mixed salt of KCl and NaCl and a residue assaying 14.5% $K_2O$ and only 0.5% $Na_2O$. The dried residue after extraction again had the equivalent weight corresponding to the content of $K_2O$ and the original appearance composition and texture.

The above figures for Example No. 2 correspond to an extraction of fully 80% of the $K_2O$ content of the material employed when using only 250 grams of NaCl and heating for a short time only. The greater part of the KCl is obtained in a concentrated mixture from which it may be very readily separated in quite pure form. The actual consumption of salt (NaCl) is only 78% of the weight of the pure KCl produced and no other materials are consumed. The excess salt with its content of KCl is all recovered and may be returned to the process. The consumption of fuel (if coal) in a commercial furnace need not exceed say 10% to 15% of the weight of the material treated. The neutral salt and treated material is without any detrimental action on the furnace linings or on iron retorts. The large iron crucible employed in the above series of experiments was carefully weighed and examined after trial and lost only 0.5% by slight scaling on the outside where slight exposure to air occurred. It carried no iron into the product and showed no attack at all inside where the charge was.

All these conditions are exceedingly favorable and render this process very economical and practically efficient for recovery of potassium chlorid on an industrial scale from natural feldspars or the like materials, a problem which has not hitherto been successfully solved in spite of many trials.

If a vertical retort furnace be employed for my herein described process I may use cast iron or steel retorts and I may provide at the lower end a door or bottom plate which is removable and is furnished with means for withdrawing the molten chlorid as it runs down and of periodically removing the charge of spent material. The retort may be slightly tapered for this purpose.

It is preferable to intimately mix at least 20% of its weight of salt with the material charged into the retort at each successive charge the remainder of the salt employed being placed on top of the charge a little at a time. The retorts may conveniently be so set that the greatest heat is on top where fusion of the salt takes place.

If containers for the charges are used the retorts may be of fireclay if preferred and either lined with metal or charged with suitable metal or refractory containers holding the reactive materials. These may for instance be conveniently in the form of metal boxes superimposed and sealing each other. These boxes may be raised or lowered through the retort and removed one by one at the top or bottom while fresh boxes are introduced at the opposite end. The finished charges may be raked out of the boxes at a convenient temperature and the containers used again.

Or any convenient form of apparatus and method of procedure which carries out the herein described conditions may be employed and I do not limit myself to the precise procedure herein described.

During the progress of the reaction hereinbefore described it is important and necessary to success to as completely as possible exclude air and moisture from access to the mixture in any form. At the temperature of reaction either oxygen or moisture will rapidly decompose the salt and the potassium chlorid, this decomposition being catalyzed and rendered more rapid by the presence of silicates such as feldspar. Chlorin is thus lost from the mixture and sodium and potassium oxids formed which recombine to form both soluble and insoluble silicates. It thus becomes impossible to secure either a good extraction of potassium or a good recovery of surplus salt under such conditions. To illustrate the great importance of excluding air and moisture to success in carrying out this process and securing only the reactions aimed at I will cite the following experiment:

*Example No. 3.*

Equal weights of feldspar and salt were intimately mixed in two similar lots.

(a) The first lot was placed in a tightly covered receptacle and heated to 1000° C. for 2 hours.

After cooling (still covered) the weight was as follows:—

Washed and dried residue recovered 97% of original.

Salt recovered (ignited) 99% of original.

The salts were entirely neutral and remarkably pure and the extraction of potash contained in the feldspar was 86% of total content.

The entire loss by evaporation and manipulation of the salts was therefore 0.4% and of the feldspar 0%. The reaction thus takes place entirely as hereinbefore indicated.

(b) The second (and precisely similar) lot of mixture was heated in an open receptacle with free access of air. At the temperature of 1000 C. the fuming was considerable and after 1 hour the mixture had lost 25% of its weight and had become strongly basic. On finally extracting with water a very poor yield of potash and an alkaline and very impure solution of the salts was obtained the proportions being about: residue recovered (in excess of original weight), salts recovered (about 60% of original weight), extraction $K_2O$ about 40% of total present.

From this it is evident that the reactions are entirely changed under these conditions.

In carrying out my invention I may also employ vessels or containers for instance vertical or horizontal retorts which may be heated internally as for instance by an electric current. Or I may heat the vessels externally by means of coal or gas firing.

In carrying out the percolation process herein described in vertical retorts it is very convenient to use the leached out excess salt solution from the final residues by mixing it into a paste with the feldspathic material for the next charge. The paste is then dried at such a temperature (for instance below 400° C.) that no decomposition of the salt can take place and the dried mixture is placed in the retorts fresh salt being added from above.

In the following claims the expression

"a chlorid" means an alkali metal chlorid or an earth-alkali metal chlorid or a mixture of such chlorids. Similarly "alkali metal" is to be understood in a sense broad enough to include alkali earth metal.

What I claim is:—

1. The process of manufacturing potassium chlorid which consists in percolating fused chlorid of an alkali metal through a mass of finely divided potassium bearing material at a temperature of from 800° to about 1200° centigrade in the absence of air and moisture and collecting and cooling the percolated salts.

2. In a process such as specified in claim 1, the addition of fused chlorid to the mass as the percolation proceeds.

In testimony whereof I have signed my name to this specification in the presence of two subscribing witnesses.

EDGAR ARTHUR ASHCROFT.

Witnesses:
GILBERT FLETCHER TYSON,
LEONARD WALTER.